(12) United States Patent
Grosskopf et al.

(10) Patent No.: US 8,313,343 B2
(45) Date of Patent: Nov. 20, 2012

(54) TERMINAL BLOCK COVER WITH NUT RETENTION FEATURE

(75) Inventors: Andrew P. Grosskopf, Rockford, IL (US); Edward C. Allen, Davis, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 198 days.

(21) Appl. No.: 12/872,072

(22) Filed: Aug. 31, 2010

(65) Prior Publication Data

US 2012/0049672 A1   Mar. 1, 2012

(51) Int. Cl.
*H01R 13/52* (2006.01)
(52) U.S. Cl. ........ 439/521; 439/113; 439/134; 439/146; 439/893
(58) Field of Classification Search ........... 439/113, 439/134, 146, 149, 521, 892, 893; 174/50, 174/66, 135
See application file for complete search history.

(56) References Cited

U.S. PATENT DOCUMENTS

| | | | |
|---|---|---|---|
| 5,169,338 A | 12/1992 | Dewar et al. | |
| 5,203,724 A * | 4/1993 | Casey | 439/792 |
| 5,413,500 A | 5/1995 | Tanaka | |
| 5,791,936 A | 8/1998 | Nicholson | |
| 6,291,878 B1 | 9/2001 | Anderson et al. | |
| 6,533,619 B2 | 3/2003 | Wakata et al. | |
| 6,576,838 B2 | 6/2003 | Matsumura | |
| 7,044,776 B2 * | 5/2006 | King et al. | 439/521 |
| 7,472,547 B2 | 1/2009 | Grosskopf et al. | |
| 2001/0001638 A1 * | 5/2001 | Hirooka | 417/410.1 |
| 2008/0197726 A1 | 8/2008 | Dubuc et al. | |
| 2008/0311763 A1 | 12/2008 | Dubuc et al. | |
| 2010/0054005 A1 | 3/2010 | Grosskopf et al. | |
| 2012/0049672 A1 * | 3/2012 | Grosskopf et al. | 310/71 |
| 2012/0133224 A1 * | 5/2012 | Grosskopf et al. | 310/71 |
| 2012/0190250 A1 * | 7/2012 | Patel et al. | 439/709 |

* cited by examiner

*Primary Examiner* — James Harvey
(74) *Attorney, Agent, or Firm* — Carlson, Gaskey & Olds, P.C.

(57) ABSTRACT

A terminal block cover includes a base having a base surface configured to be secured against a terminal block. First and second spaced apart sidewalls extend from and adjoin the base. An outer wall is spaced apart from the base and is secured to the base by and adjoins with the first and second sidewalls. A lateral wall is arranged at a first lateral side and extends between and adjoins the first and second sidewalls, the outer wall and the base, which together provide at least one terminal pocket. An inner surface is provided on the outer wall facing the terminal pocket and has first and second surfaces. The first and second surfaces are at first and second distances respectively from the base surface, and the first distance is greater than the second distance. The second surface retains a terminal nut.

9 Claims, 4 Drawing Sheets

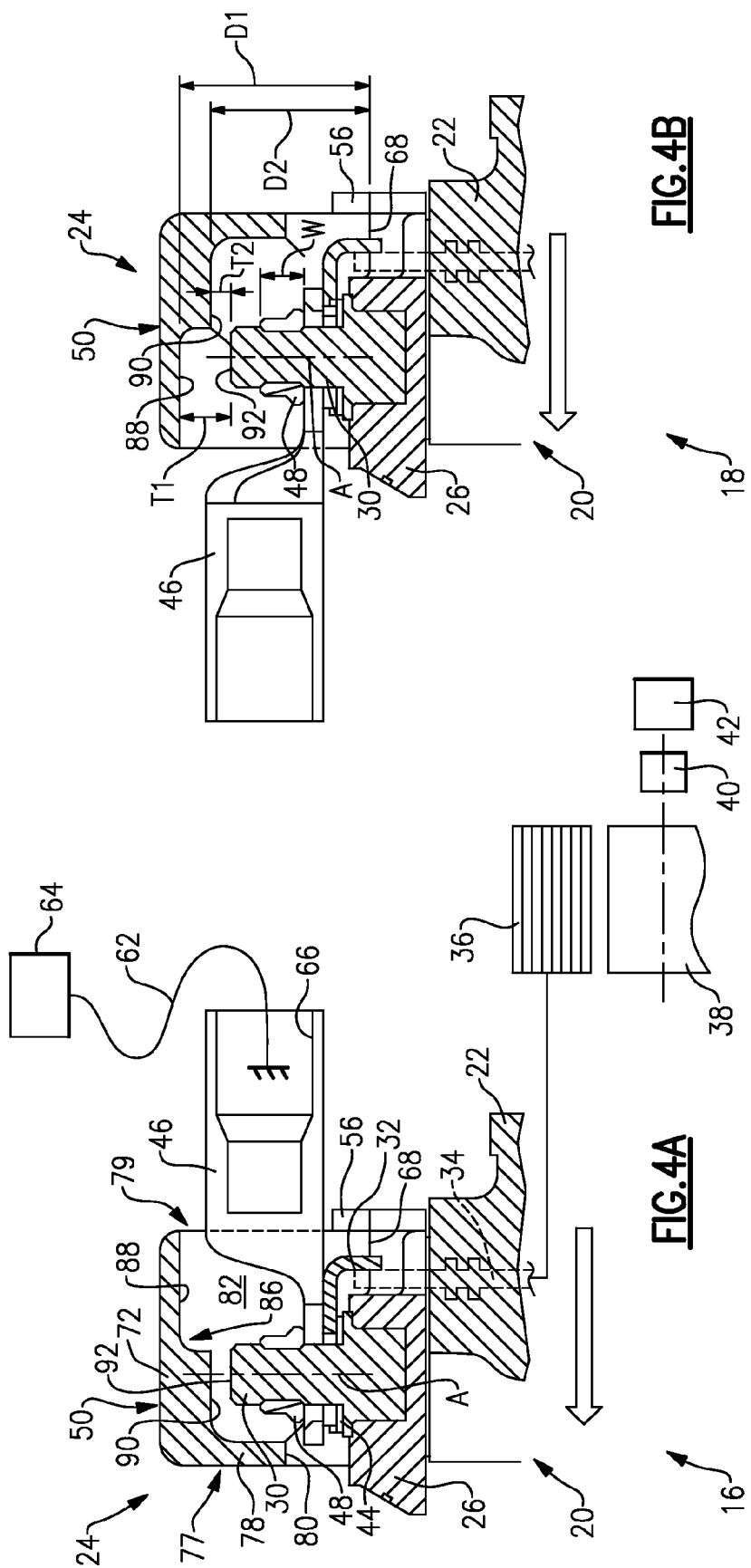

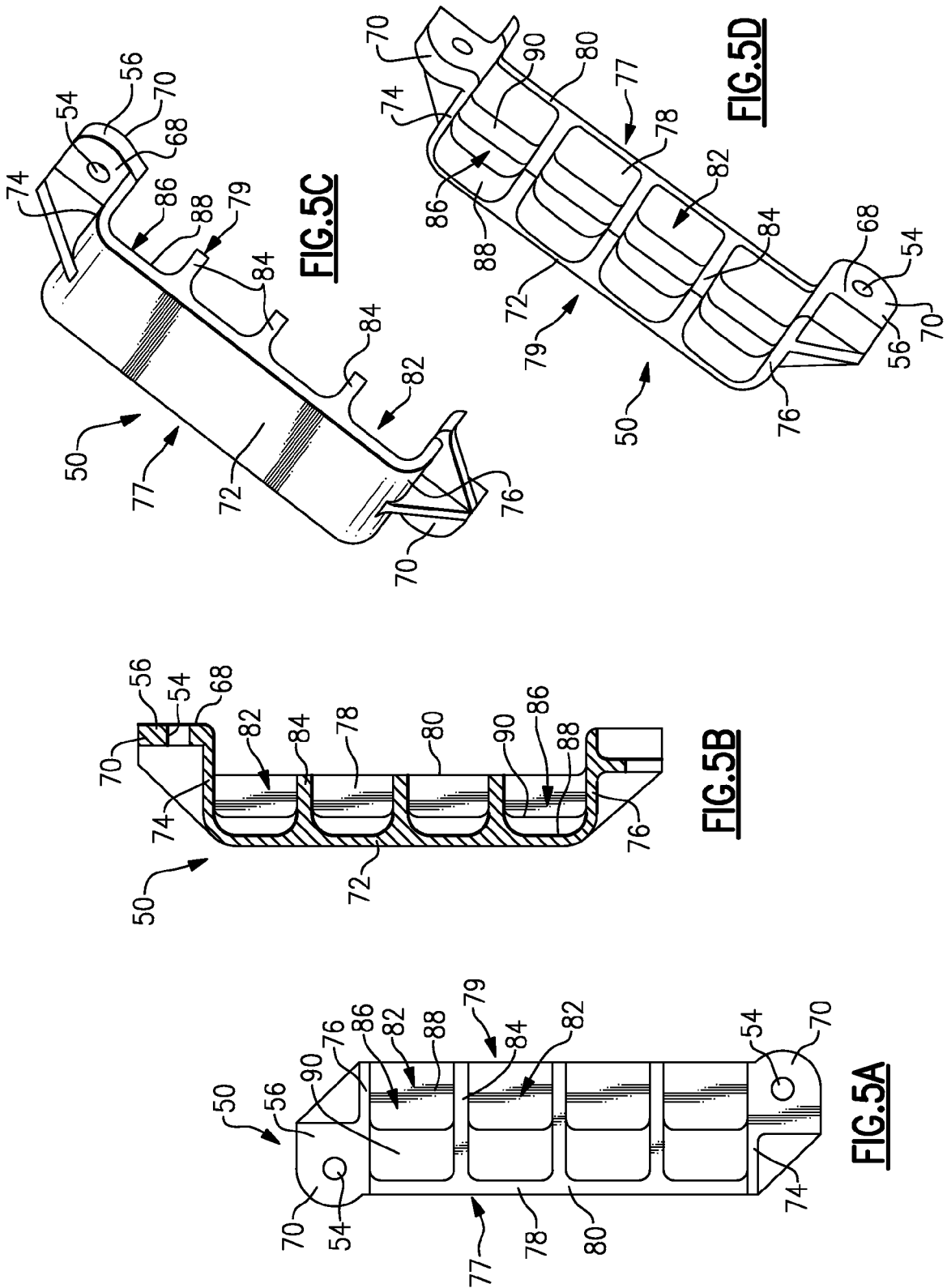

TERMINAL BLOCK COVER WITH NUT RETENTION FEATURE

BACKGROUND

This disclosure relates to a terminal block assembly, and more particular, to a terminal block assembly for use on a gas turbine engine generator.

On a gas turbine engine generator application, a terminal block cover is often used to protect the phase terminals for maintenance personnel safety and to protect the phase leads from foreign object debris that could cause shorting. In the past, copper leads with lugs at their ends have been secured to the terminals. For new applications, aluminum leads are used to reduce weight. Aluminum wire has a higher resistivity than copper wire given the same gage size wire. In order to compensate for the higher resistance of the aluminum wire, a larger gage aluminum wire is used which requires a correspondingly larger lug.

SUMMARY

A terminal block cover includes a base having a surface configured to be secured against a terminal block. First and second spaced apart sidewalls extend from and adjoin the base. An outer wall is spaced apart from the base and is secured to the base by and adjoins with the first and second sidewalls. A lateral wall is arranged at a first lateral side and extends between and adjoins the first and second sidewalls, the outer wall and the base, which together provide at least one terminal pocket. An inner surface is provided on the outer wall facing the terminal pocket and has first and second surfaces. The first surface is adjacent the second lateral side, and the second surface is provided inboard from the first surface toward the first lateral side. The first and second surfaces are at first and second distances respectively from the base surface, and the first distance is greater than the second distance.

BRIEF DESCRIPTION OF THE DRAWINGS

The disclosure can be further understood by reference to the following detailed description when considered in connection with the accompanying drawings wherein:

FIG. 4a is a cross-sectional view of the terminal block assembly with a terminal block cover in a first installed position.

FIG. 4b is a cross-sectional view of the terminal block assembly with the terminal block cover in a second installed position.

FIG. 5a is a bottom elevational view of the terminal block cover.

FIG. 5b is a cross-sectional side elevational view of the terminal block cover.

FIG. 5c is a top/side perspective view of the terminal block cover.

FIG. 5d is a bottom/side perspective view of the terminal block cover.

DETAILED DESCRIPTION

Figure 1:
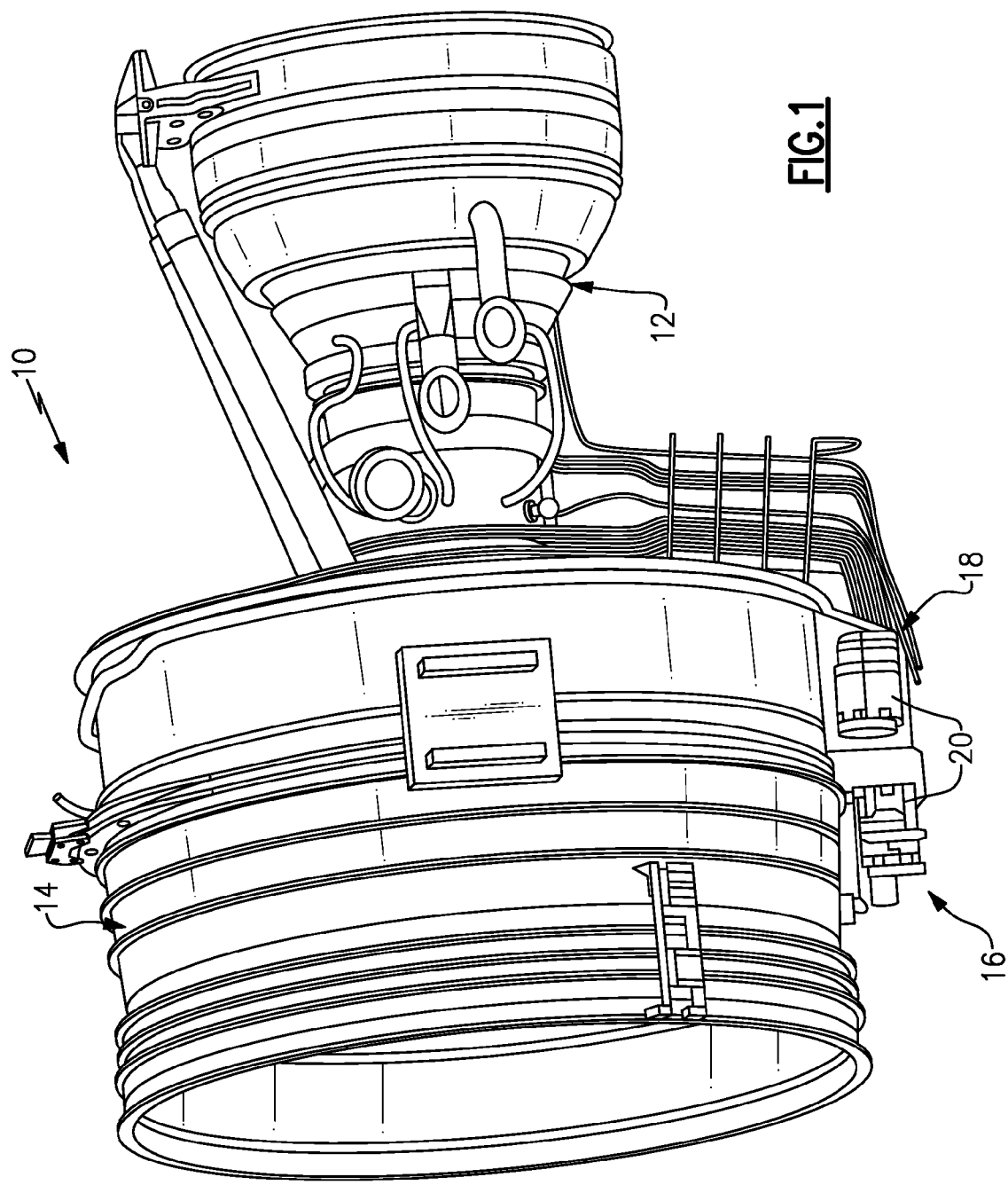
FIG. 1 is a perspective view of an example gas turbine engine.

An example gas turbine engine (GTE) 10 is shown in FIG. 1. The GTE 10 illustrated is a high bypass configuration having a core nacelle 12 driving a fan (not shown) housed within a fan nacelle 14. The arrangement shown includes forward and rearward variable frequency generator assemblies 16, 18, each having a common generator 20.

Figure 2:
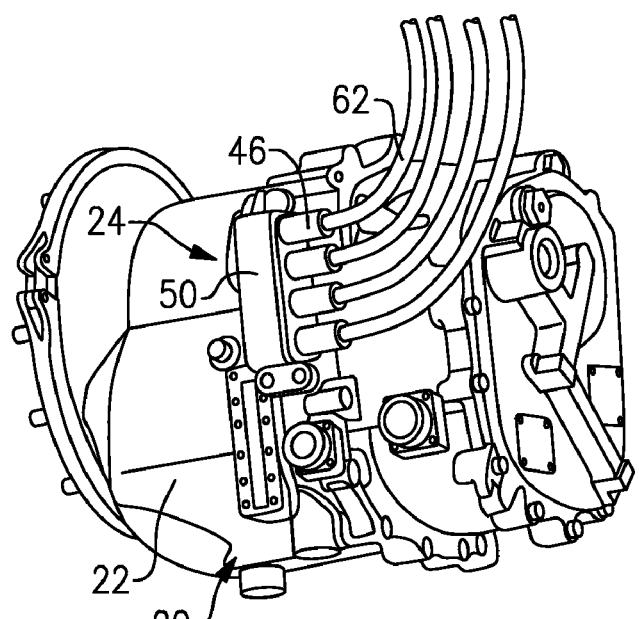
FIG. 2 is a perspective view of a generator with a terminal block assembly.
Figure 3:
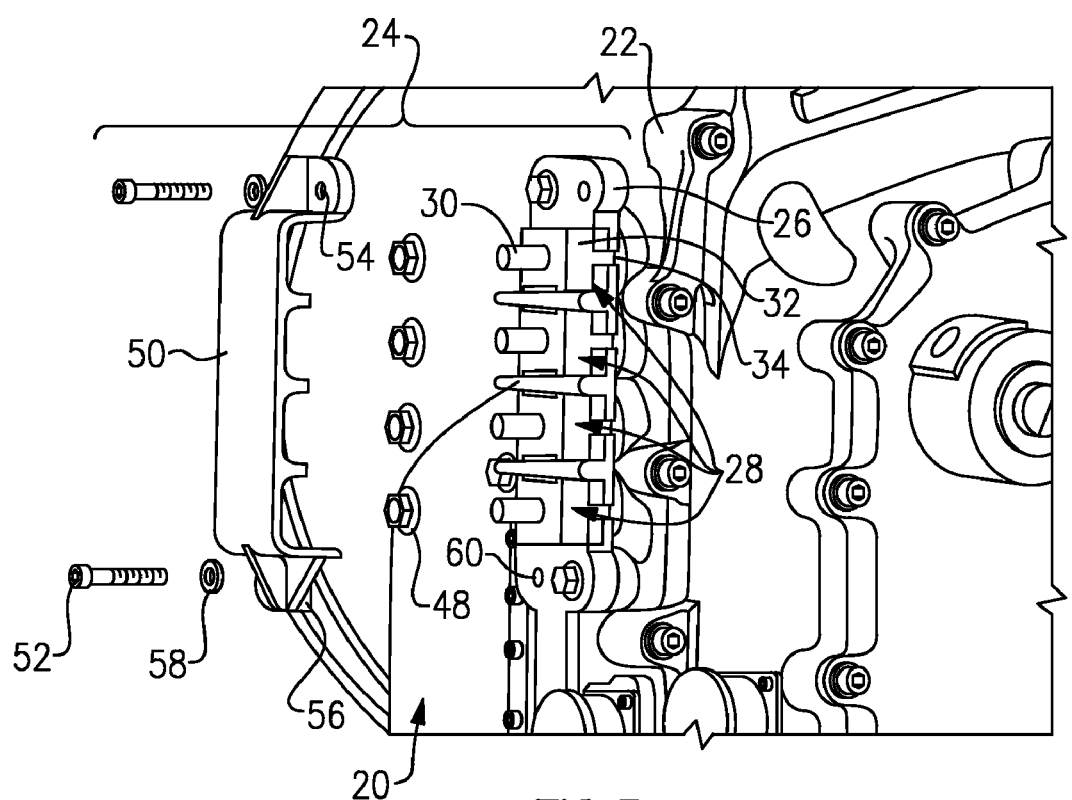
FIG. 3 is a perspective view of the generator with an exploded view of the terminal block assembly.

Referring to FIGS. 2 and 3, the generator 20 includes a housing 22 on which a terminal block assembly 24 is supported. The terminal block assembly 24 includes a terminal block 26 fastened to the housing 22. The terminal block 26 provides multiple terminals 28 to which lugs 46 are connected. Wires 62 electrically connect the lugs 46 to an electrical component 64, as shown in FIG. 4a. The terminal block 26 includes terminal studs 30 at each terminal 28, and a lug 46 is secured to its respective terminal stud 30 by a nut 48 having a nut height W (FIG. 4b). In one example, the nut 48 is a SPIRALOCK nut.

Referring to FIGS. 3 and 4a, each terminal stud 30 is electrically connected to a stator 36 within the housing 22 by via a terminal lead 34. A rotor 38, rotationally driven by a spool 42 through a gearbox 40, imparts a current in the stator 36. The terminal lead 34 has a bracket 32 received on the terminal stud 30, which is clamped between a washer 44 and the lug 46. The lug 46 includes an aperture 66 that received an end of the wire 62.

A terminal block cover 50 is secured over the terminals 28 to protect maintenance personnel and prevent foreign object debris from shorting the terminals. In one example, fasteners 52 are received in a respective hole 54 in ears at opposite corners of a base 56 of the terminal block cover 50 and secured to a corresponding threaded hole 60 in the terminal block 26, as best shown in FIG. 2. The terminal block cover 50 is configured such that it can be secured to the terminal block 26 in either of first and second installed positions (FIGS. 4a and 4b) when rotated 180 degrees, which can accommodate wires secured to the terminal block 26 from either side. A washer 58 is provided between each fastener 52 and the terminal block cover 50 in the example shown.

The base 56 has a base surface 68 is secured against the terminal block 26. Referring to FIGS. 4a-5d, first and second spaced apart sidewalls 74, 76 extend from and adjoin the base 56. An outer wall 72 is spaced apart from the base 56 and secured to the base 56 by and adjoins with the first and second sidewalls 74, 76. A lateral wall 78 is provided at a first lateral side 77 and extends between and adjoins the first and second sidewalls 74, 76, the outer wall 72 and the base 56, which together provide at least one terminal pocket 82. The terminal block cover 50 provides a rectangular box-like integral structure, which is molded from a non-metallic material (TORLON is one example).

An inner surface 86 is provided on the outer wall 72 and faces the pocket 82. The inner surface 86 has first and second surfaces 88, 90. The first surface 88 is adjacent a second lateral side 79 opposite the first lateral side. The second surface 90 provided inboard from the first surface 88 toward the first lateral side 77. The first and second surfaces 88, 90 are at first and second distances D1, D2 respectively from the base surface 68. The first distance D1 is greater than the second distance D2. In one example, the ratio of D1/D2 is approximately 1.2. In one example, D1 is approximately 1.245 inch (31.623 mm), and D2 is approximately 1.035 inch (26.289 mm).

In the example, the lateral wall 78 is generally uninterrupted and substantially encloses the pocket. In one example, the lateral wall 78 includes an edge 80 that is slightly spaced from the terminal block 26 when the terminal block cover 50 is in the installed position. The second lateral side 79 is generally exposed and receives the lug 46, which extends into the pocket 82. In one example, partition walls 84 extend outward from the inner surface 86 and the lateral wall 78 to provide discrete pockets 82 for each of the lugs 46. The lug 46 is nearer the first surface 88 than the second surface 90.

The first and second surfaces 88, 90 are respectively at first and second distances T1, T2 taken from a terminal end 92 of the terminal stud 30 parallel to its axis A. The first distance T1 (0.335 inch (8.509 mm), for example) is greater than the second distance T2 (0.125 inch (3.175 mm), for example). With the terminal block cover 50 in the installed position, the second distance T2 (approximately 0.125 inch (3.175 mm), for example) is less than the nut height W (0.282 inch (7.163 mm), for example) from the terminal end 92. The ratio of nut height to the second distance (W/T2) is approximately 2.256 inch (57.302 mm) in one example.

The inner surface 86 includes a width that extends from the second side 79 to the lateral wall 78 such that the width is offset relative to the terminal stud 30, which can be seen in FIGS. 4a and 4b. The second surface 90, which retains the terminal nut 48, overlaps more of the terminal end 92 in the first installed position, shown in FIG. 4a. However, the second surface 90 sufficiently overlaps the terminal nut 48 in the second installed position, shown in FIG. 4b.

Although an example embodiment has been disclosed, a worker of ordinary skill in this art would recognize that certain modifications would come within the scope of the claims. For example, the dimensions provided in this disclosure are nominal. For that reason, the following claims should be studied to determine their true scope and content.

What is claimed is:

1. A terminal block assembly comprising:
    a terminal block having a terminal stud extending along an axis to a terminal end and configured to electrically connect to a generator;
    a terminal nut threadingly secured to the terminal stud, the nut having a nut height;
    a terminal block cover including a base secured to the terminal block, an outer wall spaced apart from the base and secured to the base by and adjoining with at least one wall, the outer wall and the at least one wall providing at least one terminal pocket; and
    an inner surface provided on the outer wall and facing the terminal nut and having first and second surfaces, the first and second surfaces respectively at first and second distances taken from the terminal end and parallel to the axis, the first distance greater than the second distance, and the second distance less than the nut height from the terminal end.

2. The terminal block assembly according to claim 1, wherein the at least one wall includes first and second sidewalls extending from and adjoining the base, and a lateral wall at a first lateral side adjoining the first and second sidewalls and the outer wall to provide a rectangular, box-like integral structure.

3. The terminal block assembly according to claim 2, wherein the lateral wall is generally uninterrupted and substantially encloses the terminal pocket, and a second lateral side opposite the first lateral side is generally exposed and configured to receive at least one electrical lead lug.

4. The terminal block assembly according to claim 3, wherein partition walls extend outwardly between the inner surface and the lateral wall to provide discrete pockets.

5. The terminal block assembly according to claim 3, wherein a lug is provided in one of the discrete pockets and secured to the terminal stud with the terminal nut, the lug nearer the first surface than the second surface.

6. The terminal block assembly according to claim 1, wherein the inner surface includes a width extending from the second side to the lateral wall, the width offset relative to the axis providing first and second installed positions of the terminal block cover relative to the terminal block.

7. The terminal block assembly according to claim 6, wherein the second surface overlaps more of the terminal end in the first installed position than the second installed position.

8. The terminal block assembly according to claim 1, wherein the ratio of nut height to the second distance is approximately 2.256 inch (57.302 mm).

9. The terminal block assembly according to claim 8, wherein the nut height is approximately 0.282 inch (7.163 mm) and the second distance is approximately 0.125 inch (3.175 mm).

* * * * *